United States Patent
Komiyama (10) Patent No.: US 11,637,997 B2
(45) Date of Patent: Apr. 25, 2023

(54) PROJECTION APPARATUS AND CONTROL METHOD

(71) Applicant: CANON KABUSHIKI KAISHA, Tokyo (JP)

(72) Inventor: Tomoaki Komiyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 17/379,138

(22) Filed: Jul. 19, 2021

(65) Prior Publication Data
US 2022/0060669 A1 Feb. 24, 2022

(30) Foreign Application Priority Data

Aug. 24, 2020 (JP) .............................. JP2020-141103

(51) Int. Cl.
*H04N 9/31* (2006.01)
(52) U.S. Cl.
CPC .......... *H04N 9/3185* (2013.01); *H04N 9/3141* (2013.01)
(58) Field of Classification Search
CPC ..... G09G 2340/00–14; G09G 2352/00; G09G 2320/0613; H04N 21/4113; H04N 9/31; H04N 9/312; H04N 21/443; H04N 9/3179; H04N 9/3185; H04N 9/3188; H04N 9/7921; H04N 9/3141; H04N 9/317; H04N 9/3194; H04N 21/41407; H04N 2201/0096; G03B 21/00–32; G03B 21/56–64; G03B 23/00–18
See application file for complete search history.

(56) References Cited

U.S. PATENT DOCUMENTS

| | | | |
|---|---|---|---|
| 2012/0210217 A1* | 8/2012 | Abbas | G06F 9/00 715/716 |
| 2014/0101342 A1* | 4/2014 | Colenbrander | G06F 3/1423 710/14 |
| 2015/0002551 A1* | 1/2015 | Nagano | G09G 5/005 345/667 |
| 2015/0163450 A1 | 6/2015 | Miyoshi | |

FOREIGN PATENT DOCUMENTS

WO 2014141425 A1 9/2014

* cited by examiner

*Primary Examiner* — John W Miller
*Assistant Examiner* — Humam M Satti
(74) *Attorney, Agent, or Firm* — Rossi, Kimms & McDowell LLP (57) ABSTRACT

A projection apparatus executes a first processing and a second processing on image signal received from an external device, projects an image based on the image signal processed by an image processor, and switches an operation mode of the projection apparatus to a first mode, which is a low-latency mode for suppressing a delay in displaying an image, and a second mode, which is not the low-latency mode. The image processor maintains the first processing and stops the second processing in response that the operation mode of the projection apparatus is switched to the first mode from a state in which the operation mode is the second mode and the first processing and the second processing are executed.

17 Claims, 9 Drawing Sheets

PROJECTION APPARATUS AND CONTROL METHOD

BACKGROUND OF THE INVENTION

Field of the Invention

The present invention relates to a control technique for a projection apparatus capable of switching between a low-latency mode and a high-quality mode.

Description of the Related Art

Recently, a low-latency of display processing is required for the image display device used in esports (electronic sport) or the like. For this reason, some recent display devices are equipped with a function that allows switching between a low-latency mode and a high-quality mode in the image display device in conjunction with an image output device such as a video game or a PC (Personal Computer). WO 2014/141425 discloses a technique for realizing a low-latency of display processing in a TV by reducing the burden on the display processing by thinning out the image processing when operation mode of the TV is set to the game mode, thereby realizing a low-latency.

In order to realize low-latency in a projection apparatus such as a projector by the method described in WO 2014/141425, image processing performed by the projection apparatus needs to be thinned out. In the projection apparatus, in addition to the image quality enhancement processing such as noise cancellation, image processing for correcting a deformation, a rotation and an inversion caused by an installation condition of the projection apparatus, such as a keystone correction, a warping correction and a vertical and horizontal inversion correction, is performed.

However, if the image processing for correcting the above deformation, rotation, and inversion when the transition to the low-latency mode in the projection apparatus is thinned out, there is a possibility that a viewability of the projection image will be significantly decreased. Therefore, when the projection apparatus transits to the low-latency mode, it is necessary to reduce the processing load regarding the image processing and to appropriately control to suppress the decrease in the viewability of the projection image.

SUMMARY OF THE INVENTION

The present invention has been made in consideration of the aforementioned problems, and realizes techniques for performing appropriate control to reduce the processing load on the image processing when the projection apparatus transits to the low-latency mode, thereby suppressing the decrease in the viewability of the projection image.

In order to solve the aforementioned problems, the present invention provides a projection apparatus comprising: a communication unit configured to communicate with an external device; an image processor capable of executing a first processing including at least one of a deformation, a rotation and an inversion, and a second processing other than the first processing, on image signal received from the external device via the communication unit; a projection unit configured to project an image based on the image signal processed by the image processor; and a control unit configured to switch an operation mode of the projection apparatus to one of a plurality of operation modes including a first mode, which is a low-latency mode for suppressing a delay in displaying an image, and a second mode, which is not the low-latency mode, wherein the image processor maintains the first processing and stops the second processing in response that the operation mode of the projection apparatus is switched to the first mode from a state in which the operation mode of the projection apparatus is the second mode and the first processing and the second processing are executed.

In order to solve the aforementioned problems, the present invention provides a method of controlling a projection apparatus which communicates with an external device, comprising: executing image processing including a first processing including at least one of a deformation, a rotation and an inversion, and a second image processing other than the first processing, on the image signal received from the external device; projecting an image based on the image signal on which the image processing has been executed; and switching an operation mode of the projection apparatus to one of a plurality of operation modes including a first mode, which is a low-latency mode for suppressing a delay of an image display, and a second mode, which is not the low-latency mode, wherein in the image processing, the first processing is maintained and the second processing is stopped in response that the operation mode of the projection apparatus is switched to the first mode from a state in which the operation mode of the projection apparatus is the second mode and the first processing and the second processing are executed.

In order to solve the aforementioned problems, the present invention provides a non-transitory computer-readable storage medium storing a program that causes a computer to execute a method of controlling a projection apparatus which communicates with an external device, comprising: executing image processing including a first processing including at least one of a deformation, a rotation and an inversion, and a second image processing other than the first processing, on the image signal received from the external device; projecting an image based on the image signal on which the image processing has been executed; and switching an operation mode of the projection apparatus to one of a plurality of operation modes including a first mode, which is a low-latency mode for suppressing a delay of an image display, and a second mode, which is not the low-latency mode, wherein in the image processing, the first processing is maintained and the second processing is stopped in response that the operation mode of the projection apparatus is switched to the first mode from a state in which the operation mode of the projection apparatus is the second mode and the first processing and the second processing are executed.

According to the present invention, when the projection apparatus transits to the low-latency mode, an appropriate control for reducing the processing load on the image processing can be performed to suppress the decrease in the viewability of the projection image.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the present embodiment, an example in which a projector and a PC are used as an image display apparatus and an image output apparatus, respectively, will be described.

Figure 1:
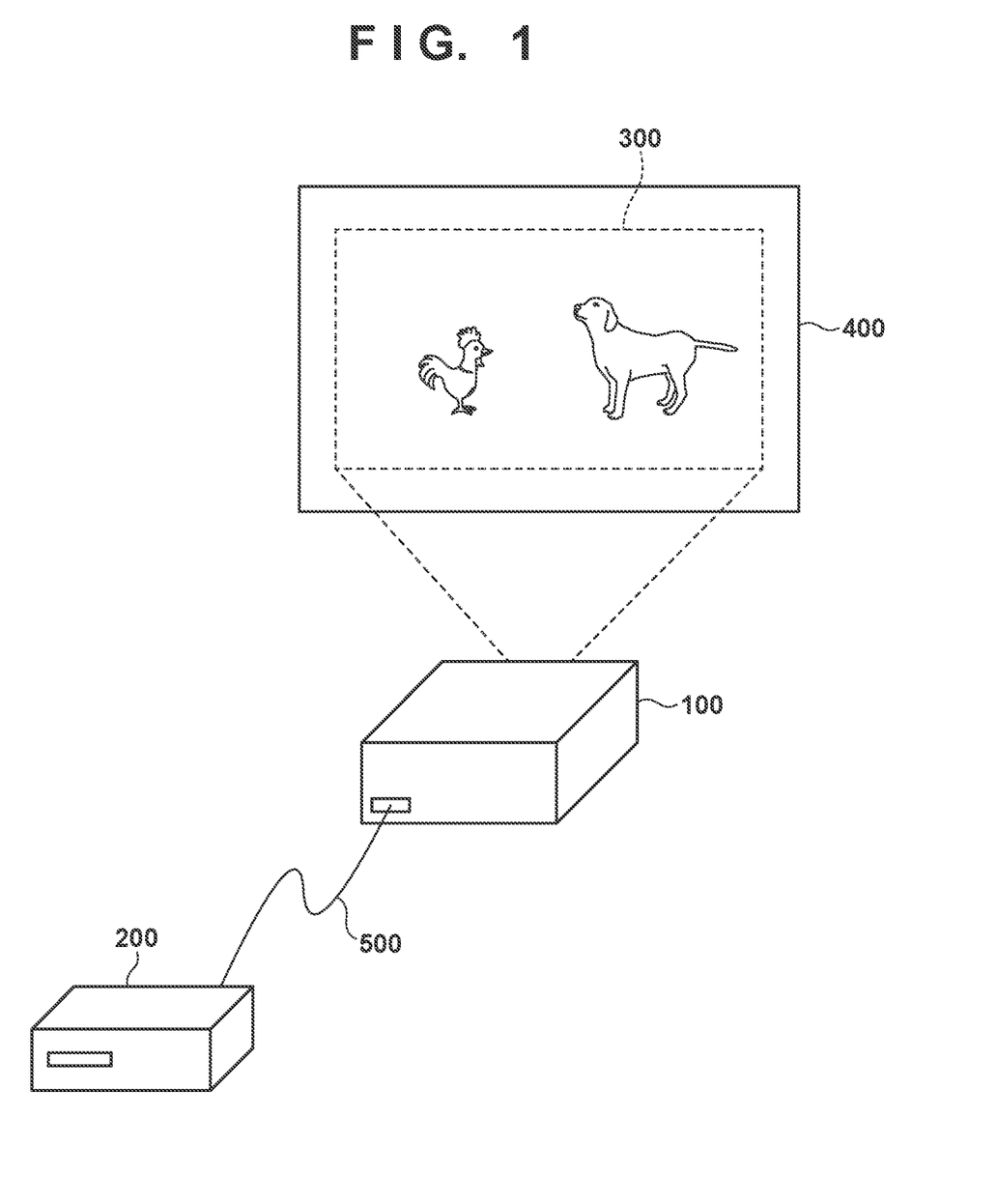
FIG. 1 is a diagram illustrating a system in which a projector and a PC are connected.

FIG. 1 illustrates an example in which a projector 100 and a PC 200 are connected to each other, an image signal output from the PC 200 is received by the projector 100, and the projector 100 displays a projection image 300 on a screen 400. The PC 200 is a Source device that outputs image signal to the projector 100 as a Sink device that displays images.

The projector 100 has an image input unit 110, which will be described later in FIG. 2A, and is connected to the PC 200 via an interface cable 500 such as a HDMI® (High-Definition Multimedia Interface cable. The PC 200 has an image output unit 206, which will be described later in FIG. 2B, and is connected to the image input unit 110 of the projector 100 via the interface cables 500.

A projection image 300 is an image which is output from the PC 200 to the projector 100, and is projected on the screen400 by performing various image processing by the projector 100.

The PC 200 can transmit a transition instruction to the low-latency mode (a first mode) or the high-quality mode (a second mode), to the projector 100. The projector 100 can be switched to the low-latency mode or the high-quality mode in response to an operation mode transition instruction from the PC 200. The low-latency mode is a mode for suppressing a delay in an image display of a video game or the like.

The configuration and functions of the projector 100 and the PC 200 will be described below.

First, the configuration and function of the projector 100 will be described with reference to FIG. 2A.

A control unit 101 includes a microcomputer including a CPU, an I/O circuit, an internal register, etc., and controls the respective blocks of the projector 100. The control unit 101 is connected to each block via a bus 133, and can exchange various signal and data with each block.

An operation unit 102 includes, for example, switches, dials, and a touch panel provided on a display unit 128 described below, and accepts user operations and transmits an operation signal to the control unit 101. Moreover, the operation unit 102 may include a signal receiver (for example, an infrared receiver 122 described below) that receives an operation signal transmitted from, for example, a remote controller (not illustrated), and output the received operation signal to the control unit 101. Furthermore, the control unit 101 receives operation signal input via the operation unit 102 and a USB interface 112 described below and control signal input from a communication unit 114, so as to control each operating block of the projector 100.

A power supply unit 103 controls the supply of power to each block of the projector 100.

A liquid crystal unit 104 includes one liquid crystal panel, three liquid crystal panels, or the like, and forms images on the liquid crystal panels.

A liquid-crystal control unit 105 controls, based on an input image signal, the voltage to be applied to each pixel of the liquid crystal panels of the liquid crystal unit 104 so as to adjust the transmittance of light, and forms an image on the liquid crystal panel. A light source 106 outputs light to the liquid crystal unit 104, and is, for example, a halogen lamp, a xenon lamp, a high-pressure mercury lamp, an LED light source, a laser diode, or a type of light source that uses a phosphor or the like to excite light emitted from a laser diode so as to convert the light wavelength.

A projection optical system 107 projects, onto the screen 400, an image formed on the liquid crystal panel of the liquid crystal unit 104. The projection optical system 107 includes a plurality of lenses and actuators for driving the lenses. By driving the lenses using the actuators, enlargement, reduction, shift, focus adjustment, etc., of the projection image can be performed.

A light-source control unit 108 controls the on/off and the light intensity of the light source 106.

An optical-system control unit 109 performs zooming, focus adjustment, and/or the like by controlling the actuators of the projection optical system 107.

An image input unit 110 can be connected to an external device such as the PC 200 via the interface cable 500 shown in FIG. 1, and receives digital image signal from the connected device. The image input unit 110 is, for example, an HDMI®, and can receive image signal, audio signal, metadata and control signal according to protocol complying with HDMI®. Moreover, when an analog image signal is received, the image input unit 110 converts the received analog image signal to a digital image signal and transmits the digital image signal to an image processor 116. That is, the image input unit 110 has a function of converting an analog image signal to a signal receivable by the image processor 116 described below, and further has a function of acquiring metadata superimposed (attached) on an image signal, a function of measuring the framerate (signal timing) of an image signal, and the like. An image output device as the external device is not limited to the PC 200 or the like, and may be a camera, a mobile phone, a smart phone, a hard disc recorder, a game console, or the like, as long as it can output image signal.

The image input unit 110 has a built-in storage unit (not illustrated) for storing Extended Display Identification Data (EDID) and the like. Moreover, the storage unit (not illustrated) stores video format information that can be received, signal transmission rates, other correspondence information to optional functions, information based on a predetermined format, and the like.

The EDID can be read/written based on an instruction from the control unit 101. When the EDID is read/written by the PC 200, the EDID is accessed via an auxiliary communication channel called DDC (Display Data Channel) of HDMI® cable which is the interface cable 500 (hereinafter, DDC-line).

The image signal input from the image input unit 110 is directly output to the image processor 116.

A universal serial bus (USB) interface 112 is an interface that accesses a memory device, which is a USB device, to read images, audio, and other data, and controls writing. Moreover, the USB interface 112 is an interface that accepts an operation signal input via a pointing device or a keyboard, which is a USB device.

A memory card interface 113 accesses a storage medium, such as a memory card, reads images, audio, and other data, and controls writing. A memory card is a memory device, such as an SD card or a CompactFlash. For example, a document file input via the memory card interface 113 is reproduced by a reproduction unit 121 which will be described later. The reproduction unit 121 generates image signal to be presented to the user from the document files, and outputs the image signal to the image processor 116.

A communication unit 114 can receive various signal and data from an external device via an intranet, an Internet, or the like. The communication unit 114 may be, for example, a wireless LAN, a wired LAN, a USB, Bluetooth®, or the like, and the communication method is not particularly limited.

An internal memory 115 is a non-volatile semiconductor memory, a hard disc, or the like that stores images, audio, and other data.

The image processor 116 performs, on an image signal received from the image input unit 110 and an image signal decoded by a replay unit 121 described below, processing for modifying the frame number, the pixel number, the image shape, etc., and processing for superimposing an on-screen display (OSD), and outputs processed signal to the liquid-crystal control unit 105. The image processor 116, for example, converts the pixel number of an image signal according to the pixel number of the liquid crystal panel, and multiplies the framerate of the input image signal and performs correction appropriate for image formation performed by the liquid crystal panel, which is driven by an alternate current (AC). Note that AC driving of the liquid crystal panel refers to a method of alternating the direction of the voltage to be applied to the pixels of the liquid crystal panel and displaying an image by using the property of the liquid crystal panel that an image can be generated when a voltage is applied in either the forward or the reverse direction. In such a case, the liquid-crystal control unit 105 needs to transmit one of each of a forward direction image and a reverse direction image, and thus, the image processor 116 performs processing to speed up the framerate of the image signal. Note that the liquid crystal unit 104 may be driven by the liquid-crystal control unit 105 according to any method that corresponds with the applied voltage, such as a drive method using an analog signal, a drive method using a digital signal according to pulse width modulation (PWM), or the like. Furthermore, in the case where a liquid crystal panel driven according to digital signal is used, a technique for reducing image quality degradation, such as a disclination caused by the driving method is used. Therefore, even when the liquid crystal panel is driven according to digital signal, the framerate may be multiplied.

Furthermore, the image processor 116 also performs a keystone (barrel shaped) correction when an image is projected onto the screen 400 at an oblique angle and the projection image is distorted, for example, into a trapezoidal shape, so as to modify the shape of the projection image so that the trapezoidal distortion is cancelled out. When the keystone correction is performed, the enlargement/reduction ratio of the image displayed on the liquid crystal panel is changed in the horizontal and/or vertical direction. In this way, the trapezoidal distortion of the projection image and the distortion in the image region on the liquid crystal panel are cancelled out, and an image having an aspect ratio similar to that of a rectangular display region is displayed on the screen 400. The keystone correction may operate automatically or may be operated in response to an operation made by the user on the operation unit 102, based on the incline angle acquired by an incline detector 117 described below.

Furthermore, the image processor 116 can also perform warping (yarn winding shape) correction that is a kind of geometric deformation for canceling the distortion when projecting with respect to a non-plane such as a cylinder or a sphere. In addition, the image processor 116 also includes a vertical inversion correction function for canceling a situation in which the projection image is also upside down when the projector 100 is installed in the ceiling mounted in the vertical inversion, and a left-right inversion correction function for canceling a situation in which the projection image is horizontally inverted when the projection image is rear-projected. These correction functions are appropriately implemented based on an instruction from the user operation on the OSD menu or a detection result of the inclination detection unit 117 or an image capture result of the image capturing unit 124, which will be described later.

The inclination detection unit 117 detects the inclination of the projector 100.

A timer 118 measures the operating time of the projector 100, the operating time of each block, and the like.

A temperature detector 119 measures the temperature of the light source 106 of the projector, the temperature of the liquid crystal unit 104, the ambient temperature, and the like.

A cooling unit 120 includes a heat sink, a fan, and the like for cooling by discharging the internal heat of the projector 100 to the outside.

The reproduction unit 121 decodes an encoded file or the like under the control of the control unit 101, and outputs the decoded file or the like to the image processor 116.

The infrared receiver 122 receives infrared light from a remote controller provided for the projector 100 or other devices, and outputs an operation signal to the control unit 101. A plurality of the infrared receivers 122 may be disposed at a plurality of positions, such as the front face and the rear face of the projector 100.

A focus detector 123 detects the distance between the projector 100 and the screen 400 and detects the focal length of an image.

An image capturing unit 124 captures an image of the image projected via the projection optical system 107 (in the direction of the screen 400) and outputs the captured image to the control unit 101. The image capturing unit 124 includes a lens group including a zoom lens and a focus lens for forming an optical image of a subject, an actuator that drives the lens group, and a microprocessor that controls the actuator. The image capturing unit 124 further includes an image capturing element, such as a CCD, a CMOS, or the like that converts the subject image formed by the lens group to an electric signal, an A/D converter that converts the analog signal acquired by the image capturing element to a digital signal, and the like.

A screen photometry unit 125 measures the intensity and luminance of the light reflected off the screen 400.

A display unit 128 is a display device formed of liquid crystal, organic EL, or the like, and is disposed in the projector 100 and displays the operating state of the projector 100, a UI screen, warnings, etc.

A display control unit 129 controls the display unit 128 under the control of the control unit 101.

A battery 130 supplies electrical power when the projector 100 is used at a location where a power outlet or the like is not provided.

A power input unit 131 accepts AC power from an external power source 140, such as an AC 100V source, rectifies the power to a predetermined voltage, and supplies the rectified power to the power supply unit 103.

A RAM 132 is used for loading programs stored in the internal memory 115 and for temporarily storing various data and frame data of the image to be projected.

Here, the term "programs" refers to programs for executing various flowcharts as described below.

The bus 133 connects the control unit 101 and each block and exchanges various signal and data with each block.

Configuration of PC 200

Next, the configurations and function of the PC 200 will be described with reference to FIG. 2B.

A control unit 201 includes a microcomputer including a CPU, an I/O circuit, an internal register, etc., and controls each block of the PC 200. The control unit 201 is connected to each block via a bus (not illustrated) and can exchange various signal and data with each block.

A media interface 202 is an interface that controls the reading and writing of images, audio, and other data from and to an optical disc, such as a DVD.

An operation unit 203 includes, for example, a switch, a dial, a touch panel provided on a display unit (not illustrated), and the like, accepts user operations, and transmits an operation signal to the control unit 201. The control unit 201 receives operation signal input from the operation unit 203 and a USB interface 208 described below and control signal input from a communication unit 207, and controls each block of the PC 200.

A power supply unit 204 controls the power supply to each block of the PC 200. A power input unit 205 accepts AC power from an external device, rectifies the power to a predetermined voltage, and supplies the rectified power to the power supply unit 204.

An image output unit 206 can be connected to an external device such as the projector 100 via the interface cable 500 shown in FIG. 1, and transmits digital image signal to the connected external device. The image output unit 206 can transmit image signal, audio signal, metadata, and control signal according to protocol complying with HDMI®. The external device is not limited to the image display device such as the projector 100, and may be a recording device, a hard disk, a game machine, or the like.

A communication unit 207 can transmit and receive various signal and data to and from the external device via an intranet, an Internet, or the like. The communication unit 207 is, for example, a wireless LAN, a wired LAN, a USB, Bluetooth®, and the like. However, the communication method of the communication unit 207 is not particularly limited.

A USB interface 208 is an interface that accesses a memory device, which is a USB device, and controls the reading and writing of images, audio, and other data. Moreover, the USB interface 208 accepts operation signal input via a pointing device and a keyboard, which are USB devices.

A RAM 209 is used for loading programs stored in a storage device 210 described below and for temporarily storing various data items and image frame data. Here, the term "programs" refers to programs for executing various flowcharts as described below.

The storage device 210 is a nonvolatile semiconductor memory, a hard disc, or the like, and stores an operating system (OS), programs, various data items, such as content including text data and image data.

Based on an instruction from the control unit 201, an image processor 211 performs various image processing on the image data stored in the storage device 210 using the RAM 209 as a frame memory, and outputs the image signal to the image output unit 206.

Next, operation when the PC 200 and the projector 100 transit to the low-latency mode in conjunction with each other at the time of displaying the image by the projector 100 and outputting the image by the PC 200 will be described.

Image Display Processing

First, processing in which the projector 100 is connected to the PC 200, and receives and displays the image signal will be described with reference to FIG. 3.

Hereinafter, a basic operation until the projector 100 is connected to the PC 200, and receives and displays the image will be described.

In the present embodiment, it is assumed that the projector 100 and the PC 200 are connected by the HDMI® cable, image signal is output from the PC 200 according to protocol complying with HDMI®, and an image is displayed by the projector 100.

Figure 3A:
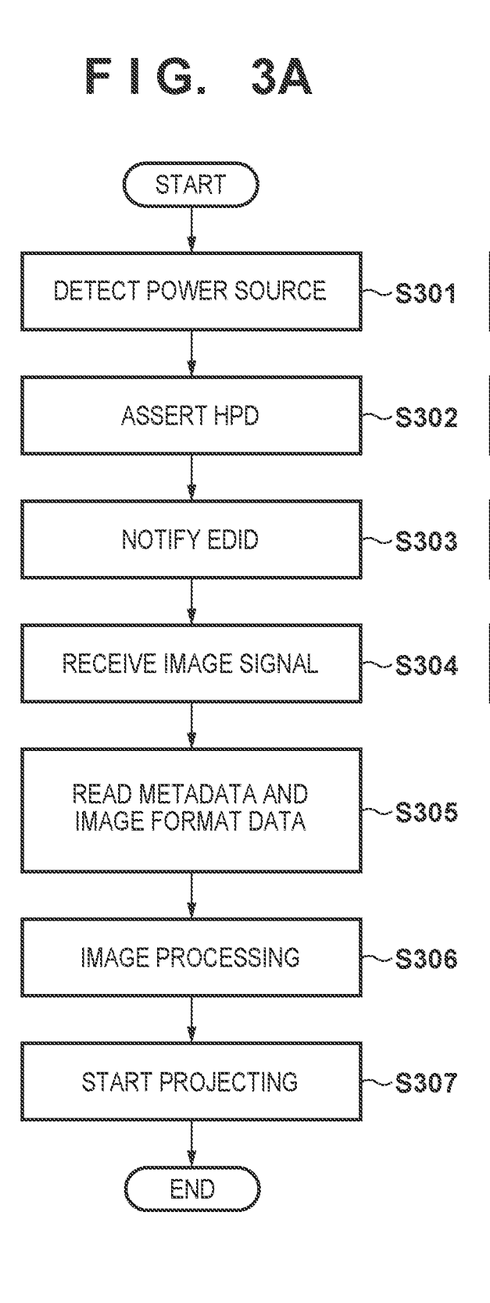
FIG. 3A is a flowchart illustrating image display processing by the projector.
Figure 3B:
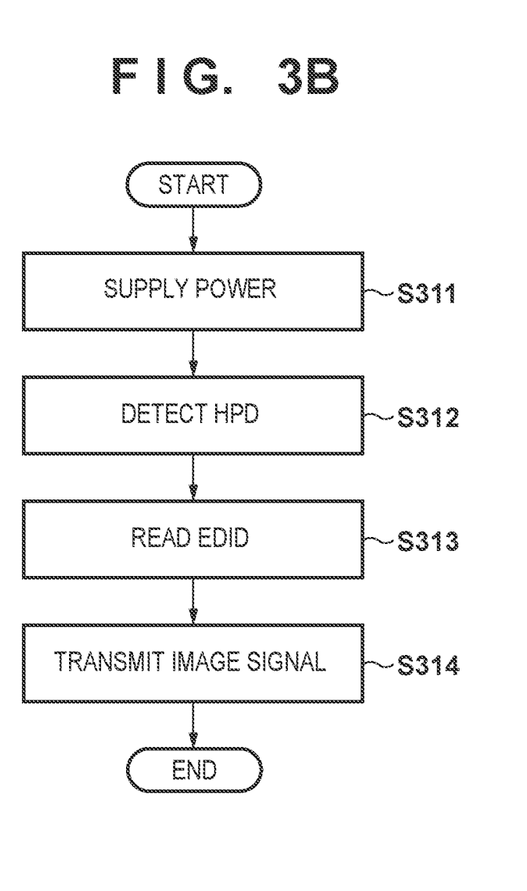
FIG. 3B is a flowchart illustrating image output processing by the PC.

FIG. 3A illustrates processing performed by the projector 100, and FIG. 3B illustrates processing performed by the PC 200. Note that the processing in FIG. 3A is realized by the control unit 101 executing a program stored in the internal memory 115 and controlling each block. Furthermore, the processing in FIG. 3B is realized by the control unit 201 executing a program stored in the storage device 210 and controlling each block. Moreover, the processing in FIG. 3B starts when a user activates an application through a menu screen or the like of the PC 200. Moreover, the processing in FIG. 3A starts when an instruction from a user for starting image display processing by the projector 100 is accepted via a remote controller (not illustrated) or the operation unit 102. The same applies to FIG. 4 which will be described later.

First, the operation of the projector 100 will be described with reference to FIG. 3A.

In step S301, the control unit 101, the PC 200 and the HDMI® cable by detect that the power supply of 5V is output through the 5V power line of the HDMI® cable from the PC 200, detect the connection with the PC 200 by the HDMI® cable.

In step S302, the control unit 101 asserts HotPlugDetect (HPD) signal via one line of the HDMI® cable, and notifies the PC 200 of the fact that the projector 100 is connected to the PC 200. The PC 200 having received the HPD signal notification requests the projector 100 to read the EDID via the DDC-line of the HDMI® cable.

In step S303, when the image input unit 110 receives the request for reading the EDID from the PC 200, the control unit 101 reads the EDID inside, and notifies the PC 200 of the read result via the DDC-line. The PC 200 reads the EDID from the projector 100 and subsequently requests a transmission of the image signal via the DDC-line.

Based on the EDID read from the projector 100, the PC 200 determines the number of lanes and the transmission rate in accordance with a video format to be transmitted, such as resolution, frame rate, and bit-depth, and transmits the image signal.

In step S304, when the image input unit 110 receives the image signal from the PC 200, the control unit 101 outputs the image signal to the image processor 116, and the image processor 116 decodes signal data, converts signal, and measures an image signal timing.

In step S305, the control unit 101 reads various metadata such as video format data from the signal data decoded by the image processor 116, and writes the metadata to a register held in the control unit 101.

In step S306, the control unit 101 performs processing such as correction for superimposing the OSD image on the image signal received from the PC 200 by the image processor 116 and converting the OSD image into a resolution suitable for displaying by the liquid crystal unit 104, keystone correction based on the user setting, warping correction, vertical and horizontal inversion correction, and/or the like.

Image signal of a predetermined format is output from the image input unit 110 through the above described processing, the image is formed on the liquid crystal unit 104 through the image processor 116 and the liquid-crystal control unit 105 and is projected by the projection optical system 107 using the light source 106 in step S307.

Next, the operation of the PC 200 will be described with reference to FIG. 3B.

In step S311, when the control unit 201 is connected to the projector 100 using the HDMI® cable, the image output unit 206 supplies power of 5V via the 5V power line of the HDMI® cable.

When the control unit 201 determines that the image output unit 206 detects that Hot Plug Detect (HPD) has been asserted via the HPD line in the HDMI® cable in step S312, the control unit 201 requests the EDID via the DDC-line and reads the EDID in step S313.

In step S314, the control unit 201 determines the format of the image signal to be output based on the content of the EDID read by the image output unit 206, and transmits the image signal to the projector 100 via the DDC-line.

According to the above described operations of the projector 100 and the PC 200, the projection of the image by the projector 100 is performed.

Operation 1 When Transition to Low-Latency Mode

Next, the operation 1 of the projector 100 and the PC 200 when a transition instruction to the low-latency mode is output from the PC 200 to the projector 100 during projecting the image by the projector 100, will be described with reference to FIGS. 4A and 4B.

Figure 4A:
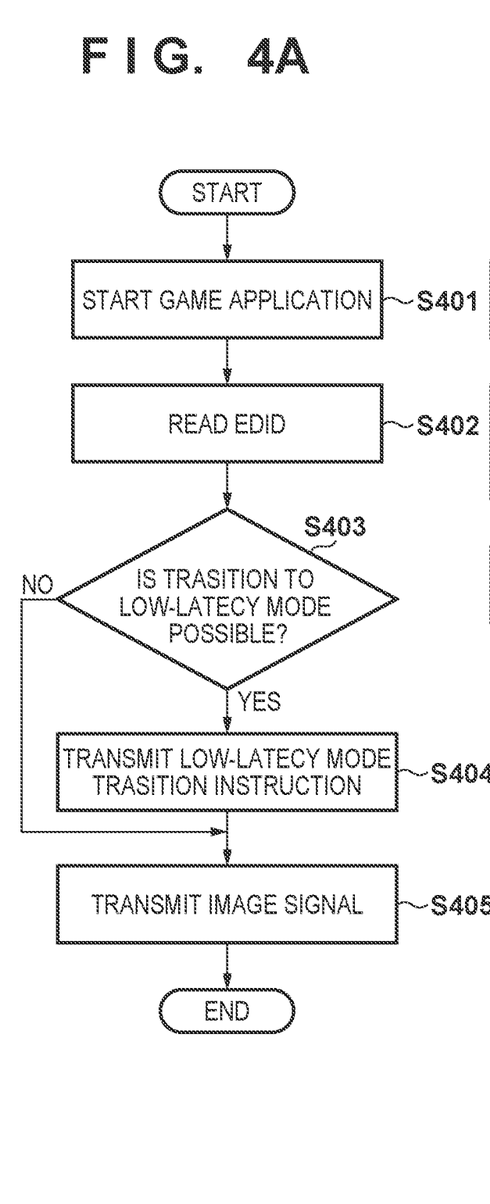
FIG. 4A is a flowchart illustrating processing by the PC in a low-latency mode.
Figure 4B:
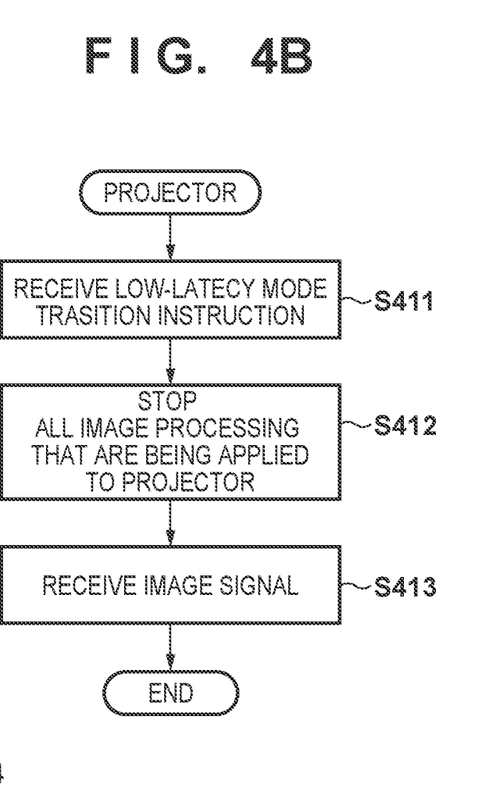
FIG. 4B is a flowchart illustrating processing by the projector in the low-latency mode.

FIG. 4A illustrates processing performed by the PC 200, and FIG. 4B illustrates processing performed by the projector 100.

First, the operation of the PC 200 will be described with reference to FIG. 4A.

Communication processing between the PC 200 and the projector 100 is performed according to protocol complying with HDMI®.

When the predetermined condition is satisfied, the PC 200 transmits a transition instruction to the low-latency mode to the projector 100. The predetermined condition is, for example, the moment at the start of a game application for which a delay reduction is required, or the moment at the transmission of the screen for the application for performing a touch operation on a projection surface, or the like.

In the present embodiment, an example in which a game application is executed and started by a user will be described.

In step S401, the control unit 201 starts executing the game application in response to a user operation.

In step S402, the control unit 201 causes the image output unit 206 to request the EDID from the projector 100, read the EDID, and write the read EDID to the RAM209.

In step S403, the control unit 201 reads information indicating the display capability of the projector 100, and determines whether or not the transition to the low-latency mode is possible, or whether or not an operation in the low-latency mode is possible, based on the information. The information indicating the display capability is stored as one-bit data in a predetermined location in the EDID of the projector 100.

Although the EDID reading processing is performed in step S402 timing in the present embodiment, the present embodiment is not limited to this timing, and the EDID reading may be performed at the timing when the projector 100 and the PC 200 are connected or at the timing when the de-assertion/assertion of the HPD is detected. However, since it is assumed that the EDID is dynamically rewritten without the control of the HPD when the projector 100 changes the operation mode by the user operation, in the present embodiment, the EDID is read at the timing in step S402 that is the start of the mode transition processing.

In step S403, when the control unit 201 determines that the projector 100 can transit to the low-latency mode or operate in the low-latency mode, the processing proceeds to step S404, and when the control unit 201 determines that the projector 100 cannot transit to the low-latency mode or operate in the low-latency mode, the processing proceeds to step S405.

In step S404, the control unit 201 transmits a low-latency mode transition instruction to the projector 100 by the image output unit 206.

In step S405, the control unit 201 starts transmitting the video game signal via the DDC-line by the image output unit 206.

Next, operation of the projector 100 will be described with reference to FIG. 4B.

FIG. 4B illustrates processing after the low-latency mode transition instruction transmitted from the PC 200 in step S404 of FIG. 4A is received.

In step S411, the control unit 101 receives the low-latency mode transition instruction from the PC 200 through the image input unit 110. When the control unit 101 detects that the low-latency mode transition instruction has been received by interrupting or polling, the processing proceeds to step S412.

In step S412, the control unit 101 issues an instruction to the image processor 116 to stop the various image processing that cause the delay and is applied to the projector 100. The image processing that causes the delay is, for example, a deformation correction such as a keystone, a warping, a correction such as inversion and a rotation, an I/P conversion or a super-resolution conversion to be predicted based on the front and rear frames, reduction processing to reduce various noises, and/or the like. When these image processing is stopped, the processing proceeds to step S413, the image input unit 110 receives the video game signal, and the projection of the image is started.

According to the above-described processing, when the projector 100 transits to the low-latency mode, the various image processing that causes the delay is stopped, so that the processing load regarding the image processing can be reduced and the delay of projecting the image can be suppressed.

Operation 2 When Transition to Low-Latency Mode

Figure 5:
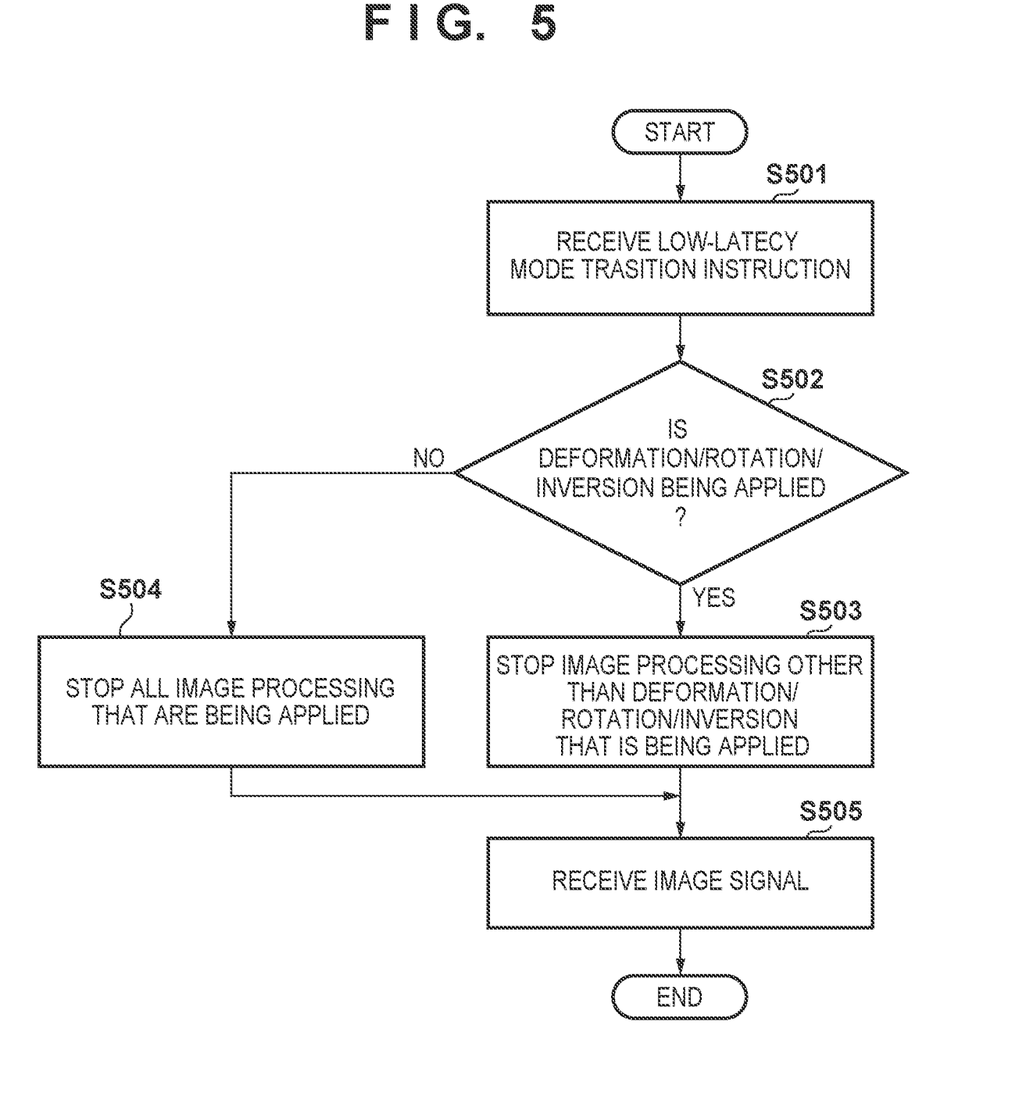
FIG. 5 is a flowchart illustrating processing by the projector in the low-latency mode of a first embodiment.

Next, the operation 2 of the projector 100 and the PC 200 when a transition instruction to the low-latency mode is output from the PC 200 to the projector 100 during projecting the image by the projector 100 will be described with reference to FIG. 5.

In the present embodiment, after receiving the transition instruction to the low-latency mode from the PC 200, the control of stopping a part or all of the image processing applied to the projector 100 will be described.

In step S501, the control unit 101 receives a low-latency-mode transition instruction from the PC 200 by the image input unit 110. When the control unit 101 detects that the low-latency mode transition instruction has been received by interrupting or polling, the processing proceeds to step S502.

In step S502, the control unit 101 determines whether or not a first processing including at least one of a deformation, a rotation, and an inversion is applied to the image projected by the projector 100. The control unit 101 performs the determination by referring to information or the like written in the internal memory 115 when the user performs setting regarding a deformation, a rotation and an inversion. As a result of the determination, when the control unit 101 determines that at least one of the deformation, the rotation and the inversion is applied, the processing proceeds to step S503, and when the control unit 101 determines that none of the deformation, the rotation and the inversion is applied, the processing proceeds to step S504.

In step S503, the control unit 101 issues an instruction to the image processor 116 to maintain the image processing that is applied among the deformation, the rotation and the inversion, and to stop the image processing other than the deformation, the rotation and the inversion that is applied. The image processing other than the deformation, the rotation and the inversion that is applied is, for example, processing for improving image quality such as a super-resolution conversion or a noise reduction that reduces various noises. In step S504, the control unit 101 issues an instruction to the image processor 116 to stop the image processing that causes the delay other than the first processing including at least one of the deformation, the rotation and the inversion.

In step S505, the control unit 101 receives the video game signal by the image input unit 110.

The user can arbitrarily change the setting of the information indicating the display capability stored in the predetermined location in the EDID of the projector 100. For example, as exemplified in an operation mode setting window of FIG. 6A, the information indicating the display capability may be rewritten according to the item selected by the user from the items that can be set as an operation mode of the projector 100. In addition, when the user selects the low-latency PRIORITY on the operation mode setting screen of FIG. 6A, the user may be notified that the setting is not possible while prohibiting an acceptance of setting items regarding a geometric deformation by for example, rewriting the information indicating the display capability to the information into the information indicating whether or not the transition to the low-latency mode is possible or the operation in the low-latency mode is possible, and graying out the setting regarding the deformation, the rotation and inversion as exemplified on a geometric deformation setting screen of FIG. 6B. Additionally, when the processing of either the deformation, the rotation or the inversion is applied to the projector 100, the information indicating the display capability may be rewritten into the information indicating that the transition to the low-latency mode or the operation in the low-latency mode is not possible.

Further, when the user sets one or more of the deformation, the rotation, and the inversion, the user may rewrite the information indicating the display capability into the information indicating that the transition to the low-latency mode or the operation in the low-latency mode is not possible, so that the PC 200 does not transmit the low-latency mode transition instruction to the projector 100, and the control unit 101 may rewrite the information of the EDID and notifies the PC 200 of the fact that the transition to the low-latency mode or the operation in the low-latency mode is not possible in advance.

This allows control so that the processing of the deformation, the rotation and the inversion is not stopped even in a projector having a specification that stops all processing of the deformation, the rotation and the inversion in the low-latency mode.

According to the first embodiment, when the projector 100 applies the image processing of the deformation, the rotation and the inversion when the low-latency mode transition instruction is received from the PC 200, the application of these image processing is maintained, and the image processing that cause the delay other than these image processing are stopped. Thus, when the projector 100 transits to the low-latency mode, it is possible to perform an appropriate control to reduce the processing load on the image processing, thereby suppressing the decrease in the viewability of the projection image.

Second Embodiment

Next, the second embodiment will be described.

In the first embodiment, an example has been described in which, when the projector 100 receives the transition instruction to the low-latency mode and applies at least one of the deformation, the rotation and the inversion, these image processing are maintained and the image processing other than these image processing that causes the delay is stopped. In contrast, in the second embodiment, the operation of the projector 100 when the low-latency mode transition instruction is received when the deformation amount is relatively small and the level at which the viewability decreases even if the deformation processing is stopped is low, regarding the deformation processing such as the keystone correction and the warping correction, will be described.

Figure 2A:
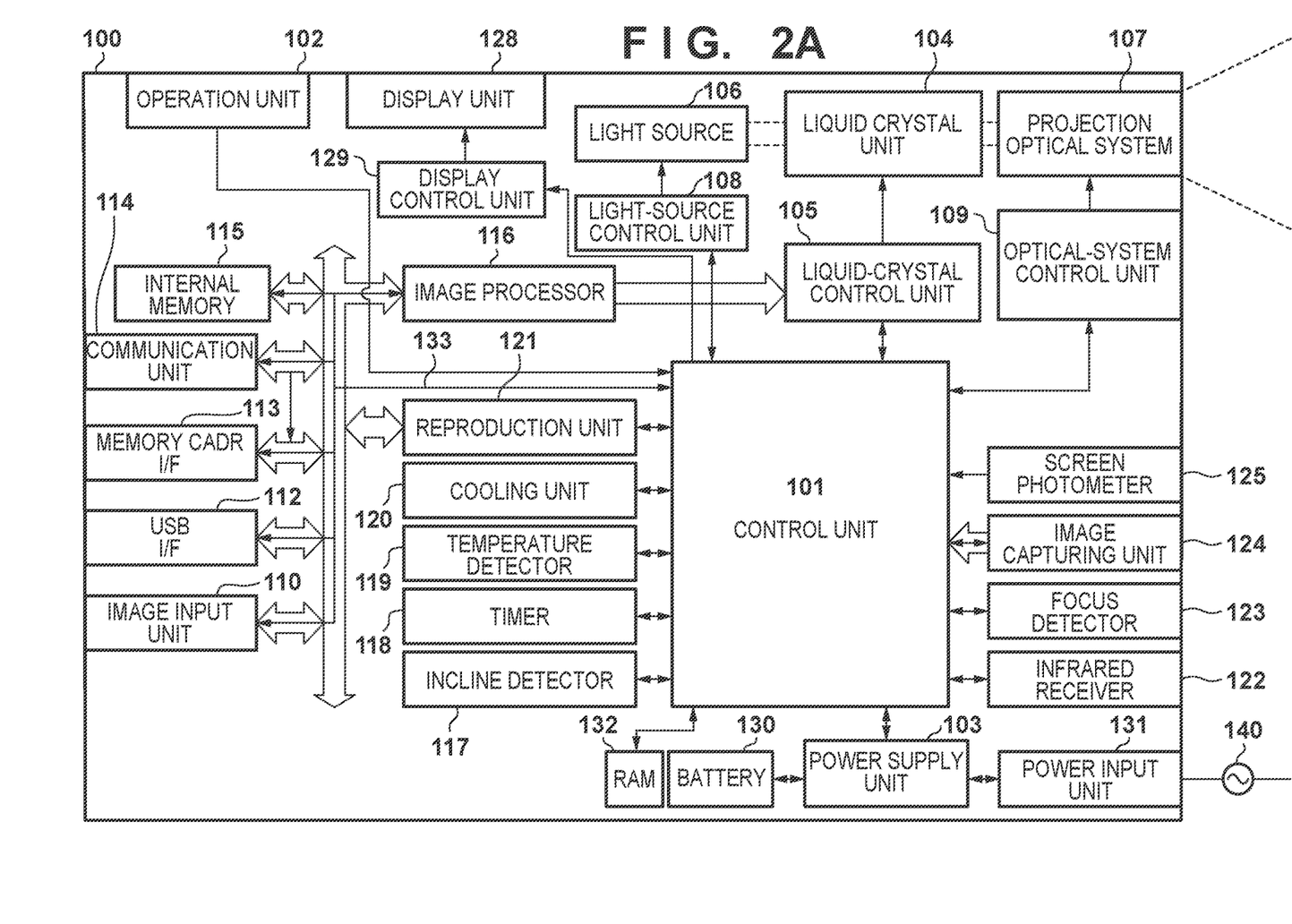
FIG. 2A is a block diagram illustrating the configuration of the projector.
Figure 2B:
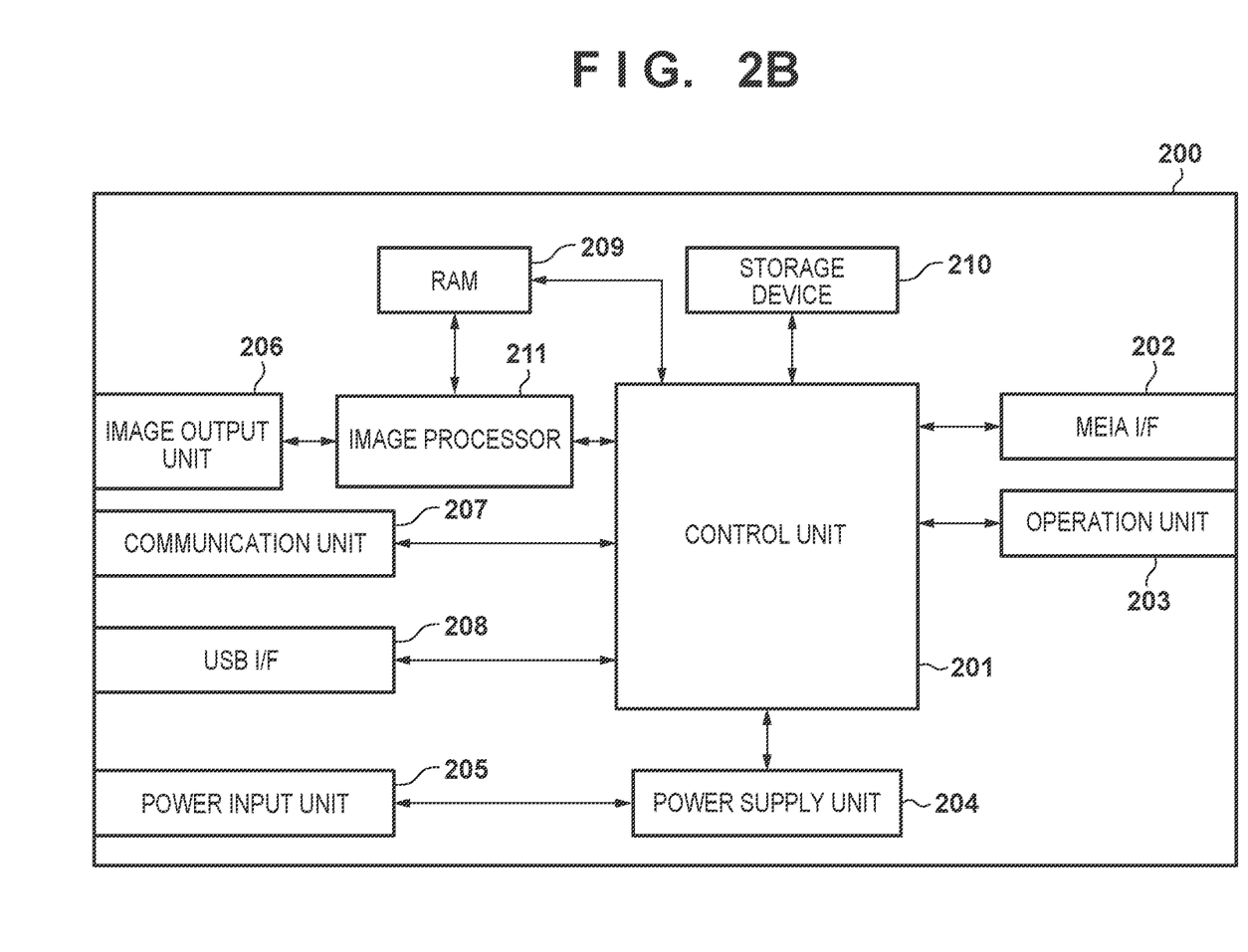
FIG. 2B is a block diagram illustrating the configuration of the PC.

In the second embodiment, the configuration of the projector 100 and the PC 200 is the same as that of FIG. 2 described in the first embodiment.

Figure 7:
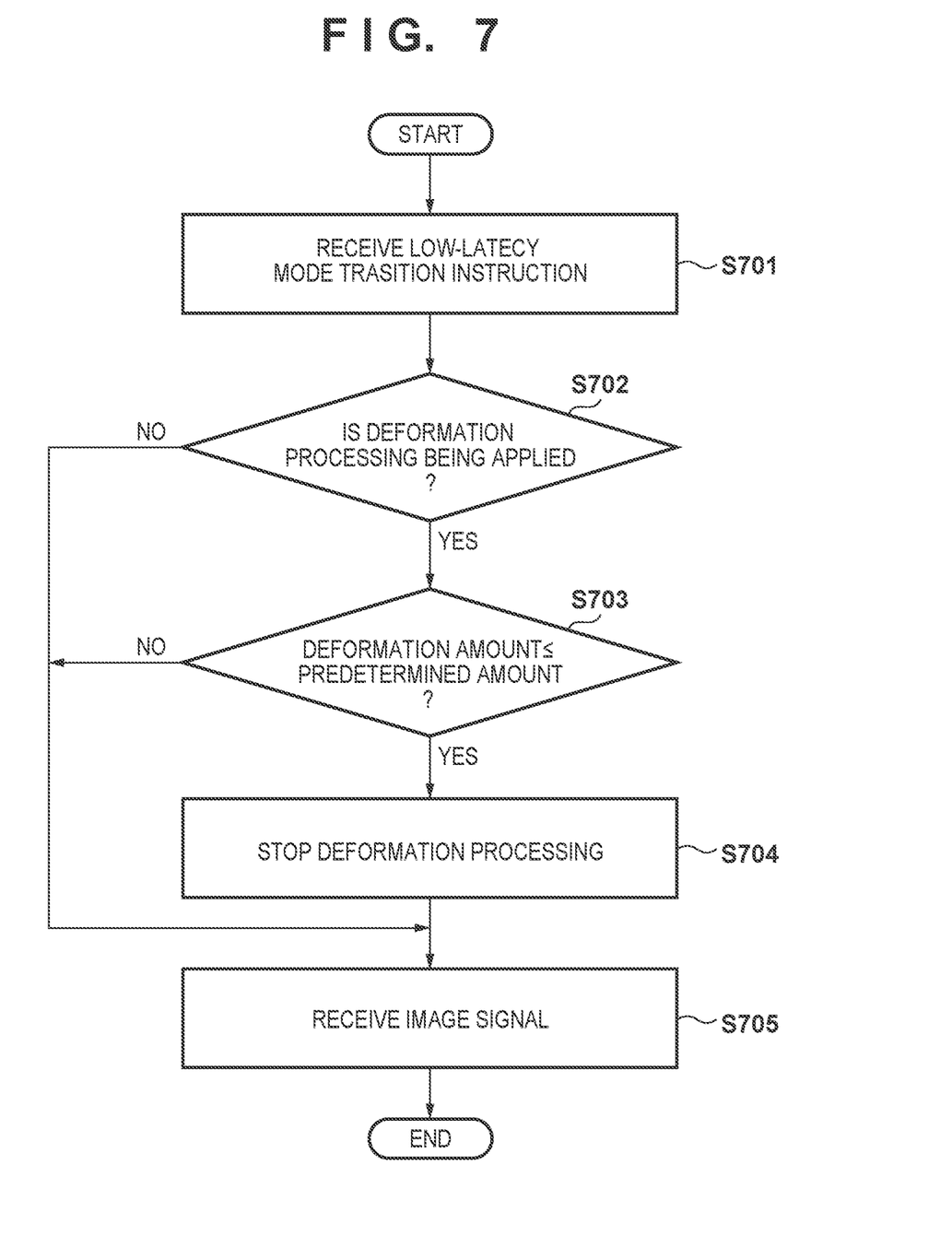
FIG. 7 is a flowchart illustrating processing by the projector in the low-latency mode according to a second embodiment.

FIG. 7 is a flowchart illustrating an operation when the projector 100 of the second embodiment receives the low-latency mode transition instruction.

In step S701, the control unit 101 receives the transition instruction to the low-latency mode from the PC 200 by the image input unit 110. When the control unit 101 detects that transition instruction to the low-latency mode has been received by interrupting or polling, the processing proceeds to step S702.

In step S702, the control unit 101 determines whether or not the deformation processing such as the keystone correction or the warping correction is applied to the image projected by the projector 100. The control unit 101 performs the determination by referring to information or the like which have been written in the internal memory 115 when the setting regarding the deformation processing such as the keystone correction or the warping correction was performed. As a result of the determination, when the control unit 101 determines that the deformation processing such as the keystone correction or the warping correction is applied, the processing proceeds to step S703, and when the control unit 101 determines that the deformation processing such as the keystone correction or the warping correction is not being applied, the processing proceeds to step S705.

In step S703, the control unit 101 determines whether or not the amount of the deformation such as the keystone correction or the warping correction, is equal to or less than a predetermined amount.

Figure 8A:
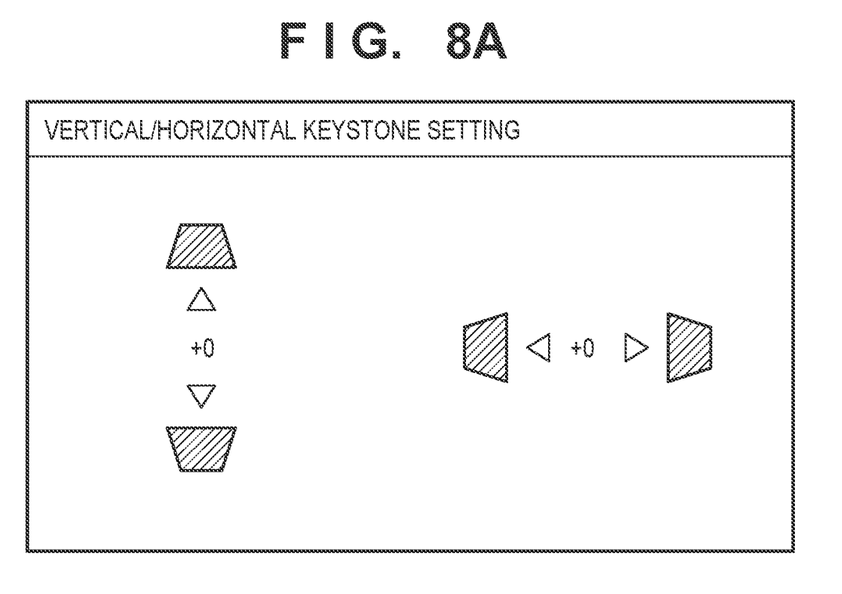
FIG. 8A is a diagram illustrating an OSD for vertical and horizontal keystone setting according to the second embodiment.
Figure 8B:
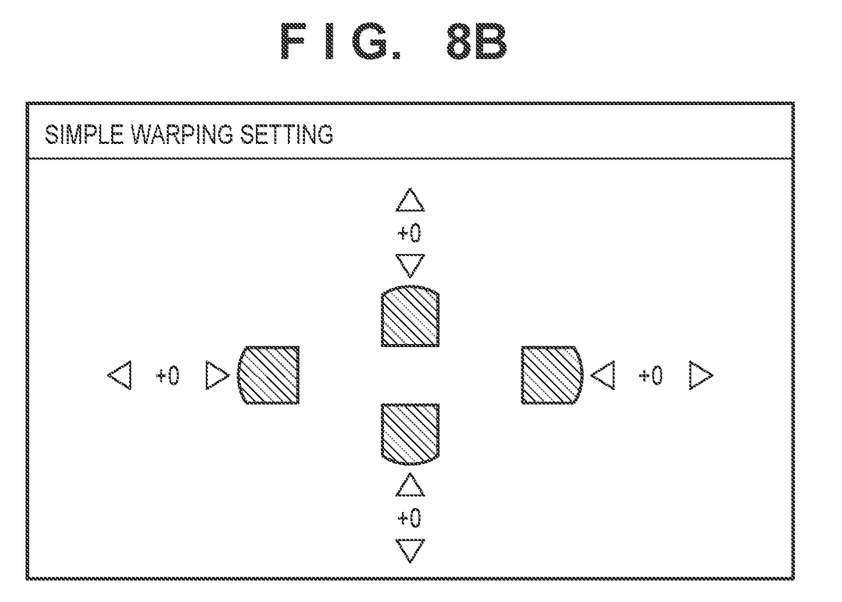
FIG. 8B is a diagram illustrating an OSD for simple warping setting according to the second embodiment.

FIG. 8A is a diagram exemplifying items that can be set by OSDs for adjusting the deformation amount of the keystone correction. FIG. 8B is a diagram exemplifying items that can be set by OSDs for adjusting the deformation amounts of the warping correction.

The user can adjust the deformation amount by operating the up, down, left, and right keys of the operation unit 102 or a remote controller (not illustrated) via the OSD. The deformation amount set by the user via the OSD is written to and held in the internal memory 115.

Here, the determination processing in step S703 will be described as an example of a condition that the predetermined amount in any one of the keystone correction setting and the warping correction setting is 3 levels or less.

For example, in the keystone correction, the condition of the adjustment level is assumed that all of the four directions on the up, down, left, and right are adjusted to be 3 levels or less, and similarly in the warping correction, the condition of the adjustment level is assumed that all of the four directions on the up, down, left, and right are adjusted to be 3 levels or less.

In step S703, the control unit 101 reads the adjustment level set for each of the keystone correction and the warping correction from the inner memory 115.

As a result of reading the adjustment level, when the control unit 101 determines that the deformation amount is equal to or less than the predetermined amount, the processing proceeds to step S704 and the control unit 101 issues an instruction to the image processor 116 so as to stop the deformation processing of the keystone correction and the warping correction that have been set.

In step S705, the control unit 101 receives the video game signal from the PC 200.

When the control unit 101 determines that the deformation processing is not being applied in step S702 or the deformation amount is not equal to or less than the predetermined amount in step S703, the processing proceeds to step S705, and the control unit 101 issues an instruction to stop the image processing which causes the low-latency other than the deformation processing, to the image processor 116.

Figure 6A:
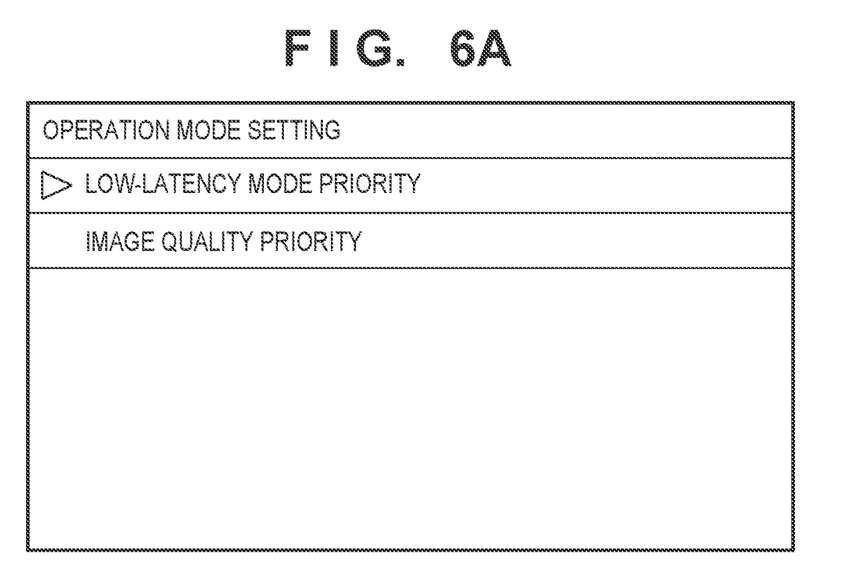
FIG. 6A is a diagram illustrating a UI (User Interface) screen for setting operation modes according to the first embodiment.
Figure 6B:
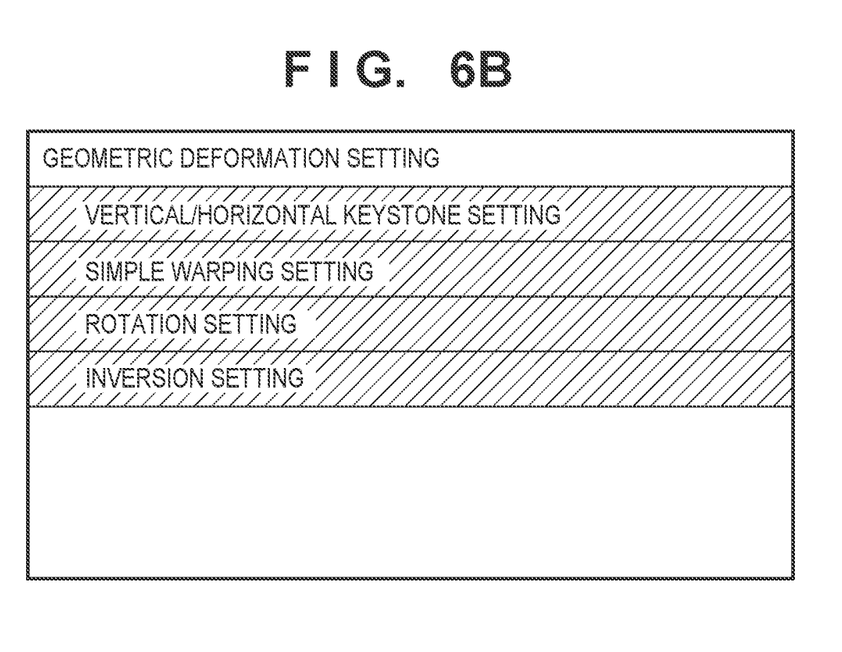
FIG. 6B is a diagram illustrating a UI screen for geometric deformation setting of the first embodiment.

Note that when the low-latency PRIORITY is selected in the operation mode setting screen of FIG. 6A of the first embodiment, during the deformation processing is applied in step S702, the deformation amount is determined to be a predetermined amount or less in step S703, the deformation processing may be controlled to stop.

According to the second embodiment, when the low-latency mode transition instruction is received in a case where the deformation amount is relatively small and the level at which the viewability decreases even when the deformation processing is stopped is low, the deformation processing is stopped in the projector 100. Thus, it is possible to perform the appropriate control for reducing the processing load on the image processing, and to suppress the decrease in the viewability of the projection image.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-141103, filed Aug. 24, 2020 which is hereby incorporated by reference herein in its entirety.

What is claimed is:

1. A projection apparatus comprising:
a communication unit configured to communicate with an external device;
an image processor capable of executing a first processing including at least one of a deformation, a rotation and an inversion, and a second processing other than the first processing, on image signal received from the external device via the communication unit;
a projection unit configured to project an image based on the image signal processed by the image processor; and
a control unit configured to switch a projection operation mode of the projection apparatus to one of a plurality of projection operation modes including a first projection mode, which is a low-latency projection mode for suppressing a delay in displaying an image, and a second projection mode, which is not the low-latency projection mode,
wherein the image processor maintains the first processing and stops the second processing in response that the projection operation mode of the projection apparatus is switched to the first projection mode from a state in which the projection operation mode of the projection apparatus is the second projection mode and the first processing and the second processing are executed.

2. The apparatus according to claim 1, wherein the image processor stops image processing that causes a delay other than the first processing in response that the projection operation mode of the projection apparatus is switched to the first projection mode from a state in which the projection operation mode of the projection apparatus is the second projection mode and the first processing is not executed.

3. The apparatus according to claim 1, wherein the first processing is deformation processing, and includes at least one of a keystone correction and a warping correction.

4. The apparatus according to claim 3, wherein when the projection operation mode of the projection apparatus is the second projection mode and a deformation amount of the first processing is equal to or less than a predetermined amount, the image processor stops the first processing in response that the projection operation mode of the projection apparatus is switched to the first projection mode.

5. The apparatus according to claim 1, wherein the control unit switches of the projection operation mode of the projection apparatus from the second projection mode to the first projection mode in response to a reception of a transition instruction to the low-latency mode from the external device via the communication unit.

6. The apparatus according to claim 1, wherein the communication unit communicates with the external device according to a protocol complying with High-Definition Multimedia Interface (HDMI®).

7. The apparatus according to claim 1, further comprising a unit configured to change information indicating a display capability of the projection apparatus to which the external device refers,
wherein when the projection apparatus starts the projection operation in the second projection mode and the first processing is executed, the information is changed to information indicating that the transition to the low-latency projection mode is not possible.

8. The apparatus according to claim 7, wherein the information is Extended Display Identification Data (EDID) from the information indicating the display capability of the projection apparatus.

9. A method of controlling a projection apparatus which communicates with an external device, comprising:
executing image processing including a first processing including at least one of a deformation, a rotation and an inversion, and a second image processing other than the first processing, on the image signal received from the external device;
projecting an image based on the image signal on which the image processing has been executed; and
switching a projection operation mode of the projection apparatus to one of a plurality of projection operation modes including a first projection mode, which is a low-latency projection mode for suppressing a delay of an image display, and a second projection mode, which is not the low-latency projection mode,
wherein in the image processing, the first processing is maintained and the second processing is stopped in response that the projection operation mode of the projection apparatus is switched to the first projection mode from a state in which the projection operation mode of the projection apparatus is the second projection mode and the first processing and the second processing are executed.

10. The method according to claim 9, wherein in the image processing, the image processing that causes a delay other than the first processing is stopped in response that the projection operation mode of the projection apparatus is switched to the first projection mode from a state in which the projection operation mode of the projection apparatus is the second projection mode and the first processing is not executed.

11. The method according to claim 9, wherein the first processing is a deformation processing, and includes at least one of a keystone correction and a warping correction.

12. The method according to claim 11, wherein in the image processing, when the projection operation mode of the projection apparatus is the second projection mode and a deformation amount of the first processing is equal to or less than a predetermined amount, the first processing is stopped in response that the projection operation mode of the projection apparatus is switched to the first projection mode.

13. The method according to claim 9, wherein in the controlling, the projection operation mode of the projection apparatus is switched from the second projection mode to the first projection mode in response to a reception of a transition instruction to the low-latency projection mode from the external device.

14. The method according to claim 9, wherein the projection communicates with the external device according to a protocol complying with High-Definition Multimedia Interface (HDMI®).

15. The method according to claim 9, further comprising changing information indicating a display capability of the projection apparatus to which the external device refers,
wherein when the projection apparatus starts the projection operation in the second projection mode and the first processing is executed, the information is changed to information indicating that the transition to the low-latency projection mode is not possible.

16. The method according to claim 15, wherein the information is Extended Display Identification Data (EDID) from the information indicating the display capability of the projection apparatus.

17. A non-transitory computer-readable storage medium storing a program that causes a computer to execute a method of controlling a projection apparatus which communicates with an external device, comprising:
executing image processing including a first processing including at least one of a deformation, a rotation and an inversion, and a second image processing other than the first processing, on the image signal received from the external device;
projecting an image based on the image signal on which the image processing has been executed; and
switching a projection operation mode of the projection apparatus to one of a plurality of projection operation modes including a first projection mode, which is a low-latency projection mode for suppressing a delay of an image display, and a second projection mode, which is not the low-latency projection mode,
wherein in the image processing, the first processing is maintained and the second processing is stopped in response that the projection operation mode of the projection apparatus is switched to the first projection mode from a state in which the projection operation mode of the projection apparatus is the second projection mode and the first processing and the second processing are executed.

* * * * *